United States Patent
Tani

(10) Patent No.: US 7,369,184 B2
(45) Date of Patent: May 6, 2008

(54) DIGITAL BROADCAST RECEIVING APPARATUS

(75) Inventor: Kazuhiko Tani, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 485 days.

(21) Appl. No.: 10/762,435

(22) Filed: Jan. 22, 2004

(65) Prior Publication Data
US 2004/0150756 A1  Aug. 5, 2004

(30) Foreign Application Priority Data
Jan. 23, 2003  (JP)  ............................ P2003-015140

(51) Int. Cl.
*H04N 5/44* (2006.01)
*H04N 5/63* (2006.01)
*G06F 3/038* (2006.01)
*G06F 1/00* (2006.01)
*G09G 5/00* (2006.01)

(52) U.S. Cl. ...................... 348/730; 348/720; 348/706; 345/212; 713/310; 713/330

(58) Field of Classification Search ................ 348/730, 348/720, 721, 705, 706, 569, 570; 345/211, 345/212; 713/300, 310, 330; *H04N 5/63*
See application file for complete search history.

(56) References Cited

U.S. PATENT DOCUMENTS

| | | | | |
|---|---|---|---|---|
| 5,287,190 A | * | 2/1994 | Ko | ............................ 348/730 |
| 5,313,282 A | * | 5/1994 | Hayashi | ....................... 348/729 |
| 5,331,353 A | * | 7/1994 | Levenson et al. | .............. 725/29 |
| 6,006,335 A | * | 12/1999 | Choi et al. | ................... 713/310 |
| 6,009,529 A | * | 12/1999 | Park | ........................... 713/320 |
| 6,054,981 A | * | 4/2000 | Kimoto et al. | ............... 345/211 |
| 6,067,121 A | * | 5/2000 | Shigihara | .................... 348/473 |
| 6,337,719 B1 | * | 1/2002 | Cuccia | ........................ 348/731 |
| 6,593,975 B1 | * | 7/2003 | Oh | .............................. 348/730 |
| 6,704,063 B1 | * | 3/2004 | Van Der Wulp | ............ 348/734 |
| 7,050,049 B2 | * | 5/2006 | Byun | .......................... 345/211 |
| 2001/0035917 A1 | * | 11/2001 | Satake et al. | ............... 348/730 |
| 2002/0186325 A1 | * | 12/2002 | Mears et al. | ................. 348/730 |

FOREIGN PATENT DOCUMENTS

JP  3275878  4/2002

* cited by examiner

Primary Examiner—Brian P. Yenke
(74) Attorney, Agent, or Firm—Osha·Liang LLP

(57) ABSTRACT

In a digital broadcast receiving apparatus, when a power source operation input is done by a user during execution of a starting sequence, a control part stops the execution of the starting sequence and counts the number of operations for a preset time. When the number of operations is odd, an ending sequence is executed and a power source is stopped. On the other hand, when the number of operations is even, the starting sequence is resumed from the beginning and when the power source operation input is not done again, the starting sequence is executed and completed. When the starting sequence is completed, based on a digital broadcast signal of a desired channel received by a tuner through an antenna, a video signal and a sound signal are generated and are outputted to a display unit.

5 Claims, 2 Drawing Sheets

DIGITAL BROADCAST RECEIVING APPARATUS

BACKGROUND OF THE INVENTION

1. Field of the Invention

This invention relates to a digital broadcast receiving apparatus for receiving a digital broadcast signal and outputting a video signal and a sound signal of a channel selected.

2. Description of the Related Art

When a digital broadcast receiving apparatus receives a digital broadcast signal by a tuner through an antenna, a digital broadcast signal of a channel selected by a user is extracted and is reproduced to video data and sound data by a decoder. The video data and the sound data reproduced are inputted to an encoder and are converted into a video signal and a sound signal of a predetermined format according to specifications of a display unit for displaying video and are outputted. The display unit displays video on a display screen based on the video signal inputted, and outputs sound from a speaker.

In such a digital broadcast receiving apparatus, a starting sequence of initialization, etc. of an IC provided in each block such as the decoder inside the apparatus is executed at the time of starting of the apparatus, so that it takes time to perform these processing and long latency time (ten seconds to one minute) is required as compared with an analog broadcast receiving apparatus. Further, processing such as error correction is performed in the case of decoding the digital broadcast signal of the channel selected, so that long time is further required by the time when video is outputted. Hereinafter, this time is called latency time.

A digital broadcast receiving apparatus for outputting sound or an image to a user for this latency time is disclosed, for example, in Japanese Patent No.3,275,878.

In the conventional digital broadcast receiving apparatus as described above, means for relieving an uncomfortable feeling of the user by outputting the image or the sound for the latency time since the starting sequence was started is provided, but an interrupt of an operation command cannot be performed on the way. For example, when a user pushes a power source operation button of a remote control unit, etc. by mistake during a power source stop of a body of the apparatus, execution of the starting sequence is started. Once the starting sequence is executed thus, a power source could not be stopped immediately even when the power source operation button is pushed again. As a result of this, once the user pushes the power source operation button, the user had to wait for the apparatus to start over a predetermined latency time and, that is, until the apparatus performs normal video reproduction after the starting of the apparatus is completed and video is outputted, the power source could not be stopped.

SUMMARY OF THE INVENTION

An object of the invention is to provide a digital broadcast receiving apparatus capable of doing a power source operation input even during execution of a starting sequence.

A digital broadcast receiving apparatus according to the invention includes: an apparatus body; power source operation means for accepting a power source operation of the apparatus body; and control means for starting execution of a starting sequence when a power source operation is inputted at the time of a stop of the apparatus body and stopping the starting sequence to start execution of an ending sequence when the power source operation is inputted during the starting sequence execution.

In this configuration, when a user operates a power source operation button mounted in a remote control unit or the apparatus body in a power source stop state of the apparatus body, that is, in a state in which operating electric power is not supplied to each block inside the apparatus with electric power supplied to a main power source, this operation command is inputted to the control means and a starting sequence is started. Then, when the power source operation button is again operated by the user during execution of the starting sequence, the control means stops the execution of the starting sequence on the way and starts execution of an ending sequence and shifts an apparatus power source to a stop state after the completion of the ending sequence.

Also, in a digital broadcast receiving apparatus according to the invention, preferably, when the power source operations are inputted plural times during the starting sequence execution, either execution of the starting sequence or execution of the ending sequence is started in response to the number of power source operations inputted.

In this configuration, when a user operates a power source operation button plural times while the control means executes a starting sequence, the control means counts the number of power source operations. Then, it is selected whether the starting sequence is resumed or an ending sequence is started in response to this count value. For example, when the number of power source operations is odd, the ending sequence is started and when the number of power source operations is even, the starting sequence is resumed.

Also, a digital broadcast receiving according to the invention may further includes: an operation display lamp which is turned on when the apparatus body is in operation and turned off when the apparatus body is in stop, and the operation display lamp is blinked during the starting sequence execution and the operation display lamp is turned off during the ending sequence execution.

In this configuration, the present sequence execution state is shown to a user by blinking an operation display lamp such as a power source lamp mounted in the front of the apparatus body during the starting sequence execution and turning off the operation display lamp such as the power source lamp during the ending sequence execution.

DETAILED DESCRIPTION OF THE PREFERRED EMBODIMENTS

A digital broadcast receiving apparatus according to an embodiment of the invention will be described with reference to the drawings.

Figure 1:
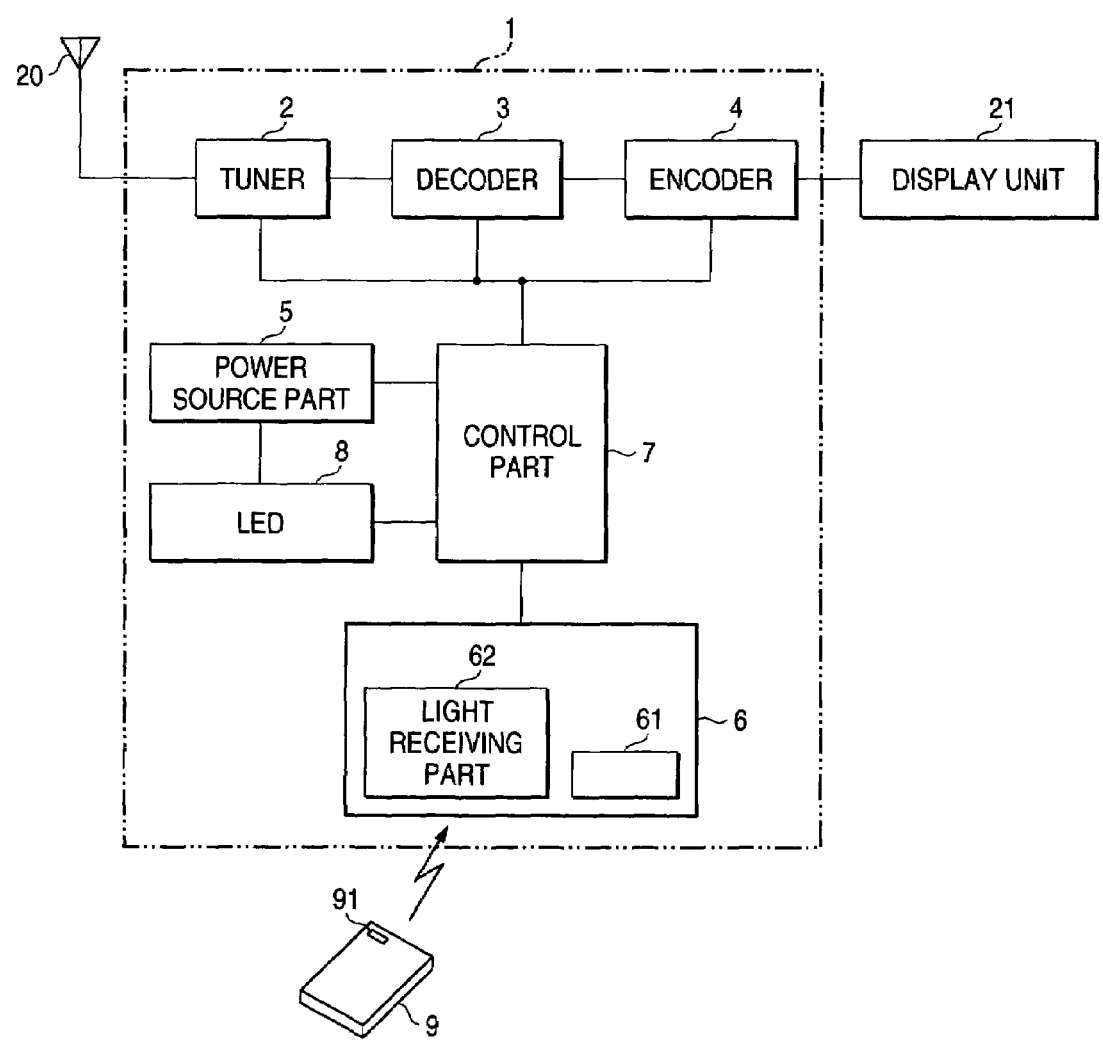
FIG. 1 is a block diagram showing a main part of a digital broadcast receiving apparatus according to an embodiment of the invention.

FIG. 1 is a block diagram showing a main part of the digital broadcast receiving apparatus according to the embodiment of the invention.

Figure 2:
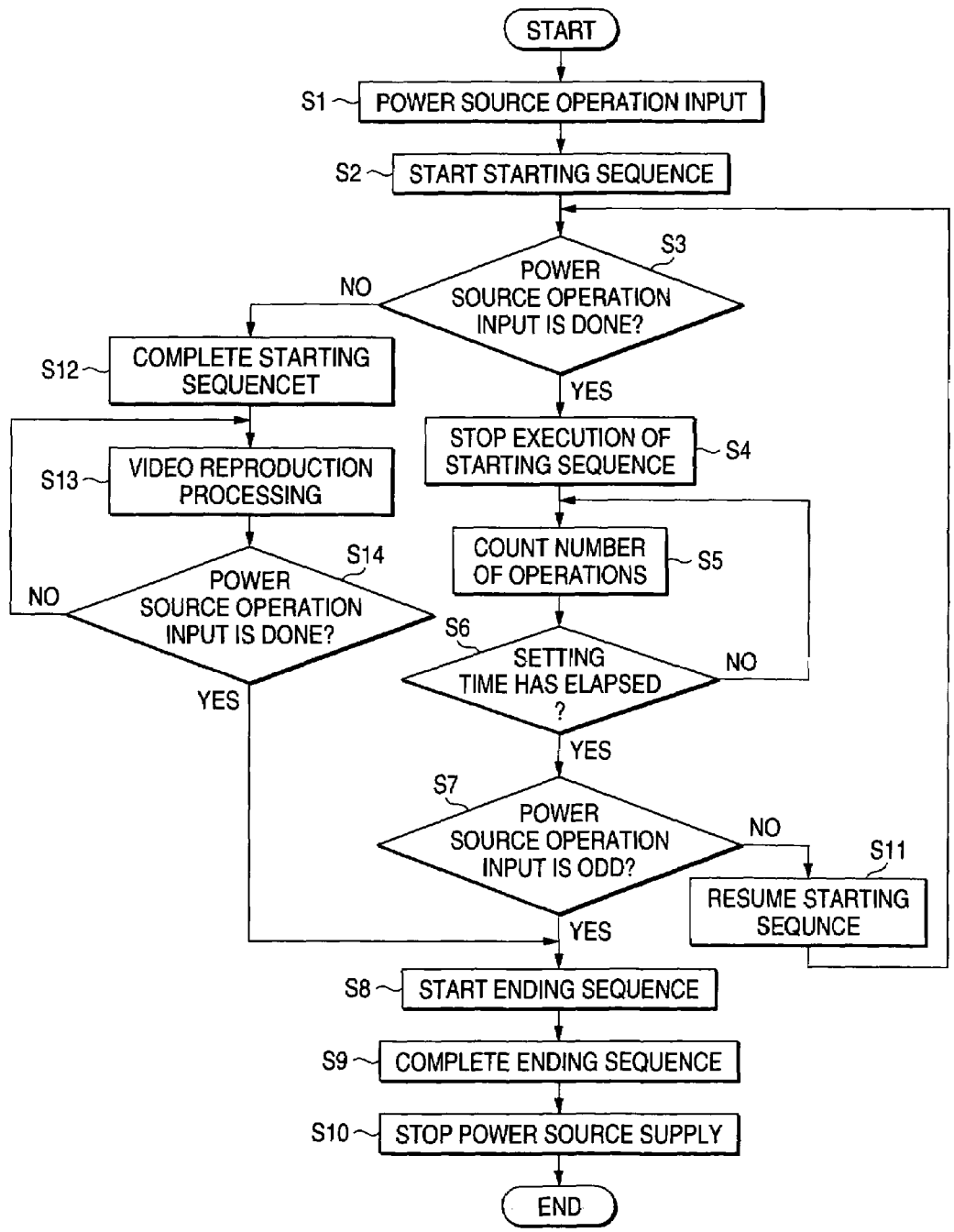
FIG. 2 is a flowchart showing an operation of a control part with respect to an input of a power source operation.

FIG. 2 is a flowchart showing execution of a control part of the case of doing a power source operation input.

As shown in FIG. 1, a digital broadcast receiving apparatus 1 includes a tuner 2, a decoder 3, an encoder 4, a power source part 5, a control part 7, an LED 8 corresponding to an operation display lamp of the invention, and an operation part 6 and a remote control unit 9 having power source operation buttons 61, 91 corresponding to power source operation means of the invention. Also, the operation part 6 is provided with a light receiving part 62 for receiving an operation signal from the remote control unit 9.

An antenna 20 is connected to the tuner 2, and a display unit 21 such as a television image receiving unit is connected to the encoder 4.

Subsequently, an operation performed by the time of outputting video and sound to the display unit 21 after a digital broadcast signal is received by the antenna 20 will be described.

Digital broadcast signals received by the antenna 20 are inputted to the tuner 2, and only the broadcast signal of a channel selected is extracted. Here, a user makes a selection of the channel using the remote control unit 9 or the operation part 6 provided in a body, and a channel selection signal from the operation part 6 or the remote control unit 9 is inputted to the control part 7. The control part 7 controls the tuner 2 so as to extract the digital broadcast signal of the selected channel based on the channel selection signal.

The digital broadcast signal of the channel received and extracted by the tuner 2 is inputted to the decoder 3. The decoder 3 decodes the digital broadcast signal inputted. In this case, the decoding is performed after processing such as error code correction is performed so that the digital broadcast signal inputted can be decoded accurately. By performing the decoding, the digital broadcast signal is separated into video data, sound data and attached information such as program information, and the video data and the sound data are outputted to the encoder 4. In this case, the video data and the sound data may be individually outputted, respectively, or the video data and the sound data may be converted into digital data of a predetermined format (for example, a transport stream) and be outputted.

The encoder 4 encodes the inputted video data and the sound data or the digital data into a video signal and a sound signal of, for example, an analog mode when the display unit 21 is a television image receiving unit of an analog mode according to specifications of the display unit 21 connected to the encoder 4, and outputs the signals to the display unit 21.

The encoder 4 is provided with an OSD image output circuit, and when a predetermined OSD image signal is inputted from the control part 7, the OSD image signal is superimposed on a predetermined line of the video signal and is outputted to the display unit 21.

Incidentally, the control part 7 performs control so that the LED 8 is turned on when the apparatus is in operation and the LED 8 is turned off when the apparatus is in stop. As a result of this, a user can visually identify whether the apparatus is in operation or in stop.

Subsequently, a start and a stop of such a digital broadcast receiving apparatus will be described with reference to FIG. 2.

When a user pushes the power source operation button 91, 61 provided in the remote control unit 9 or the operation part 6 of the apparatus body in the case that the apparatus body is in a power source stop state, a power source operation signal is inputted to the control part 7 (S1), and the control part 7 reads out a starting sequence stored in memory and starts execution of its program (S2). When the starting sequence is executed, initialization of an IC of each block such as the decoder 3 provided inside the apparatus, readout of necessary programs, temporary storage into memory, receiving of a broadcast signal, decoding, etc. are performed. Further, the control part 7 blinks the LED 8, and outputs an image indicating that the apparatus is starting to the display unit 21 through the OSD output circuit of the encoder 4.

When the user again operates the power source operation button 61, 91 during this starting sequence execution, the control part 7 counts the number of operations and stops the execution of the starting sequence (S3→S4→S5). The starting sequence performs the plural operations as described above and generally requires about ten seconds to one minute to complete. For a period of setting time (for example, 2 to 5 seconds) which is shorter than the time required for completing the starting sequence, the control part 7 counts the number of power source operation signals inputted (the number of power source operations) (S5). After the elapse of the setting time (S6), when the number of power source operations counted is odd, execution of an ending sequence is started (S7→S8). When the ending sequence is executed, the control part 7 controls predetermined ending processing such as storage of the channel received at present and when these ending processing is completed, the ending sequence is completed and power source supply from the power source part 5 to each the block inside the apparatus is stopped (S9→S10). That is, it shifts to a state (power source stop state) in which starting is not performed with a main power source supplied. Then, the control part 7 turns off the LED 8 during the execution of this ending sequence.

Incidentally, when a power source operation input is not done during the execution of the starting sequence, the starting sequence is executed to the end and is completed (S3→S12). The starting sequence is completed and thereby, as described above, video reproduction processing in which a video signal and a sound signal of a predetermined format are generated based on a digital broadcast signal inputted by an antenna is performed and a user can view a desired program (S13).

On the other hand, when the number of power source operations is even, the control part 7 resumes execution of the starting sequence. Here, the starting sequence is not resumed from the processing stopped after the power source operation input is done but is again executed from the first processing of the starting sequence (S7→S11). When the power source operation input is not done again after the starting sequence is resumed, the starting sequence is executed to the end and is completed and the video reproduction processing described above is performed and the user can view a desired program (S3→S12→S13).

When the user operates the power source operation button 91, 61 of the remote control unit 9 or the operation part 6 during program viewing (S14), the control part 7 starts execution of the ending sequence and completes the execution and stops power source supply from the power source part 5 to each the block (S8→S9→S10).

By such a configuration, the user again pushes the remote control unit or the operation part of the apparatus body during the apparatus starting and thereby, a power source of the apparatus can be stopped without waiting for the starting sequence to be completed. That is, even when the user pushes the power source operation button by mistake, the power source can be stopped at once.

Also, for example, as in the case of pushing the power source operation button in order to want to start again after pushing the power source operation button by mistake during the apparatus starting, even when the user pushes the power source operation button plural times during the starting sequence execution, the number of operations is counted and the starting sequence or the ending sequence is executed based on this number counted, so that a starting or ending operation with user's intent can be performed.

Also, by blinking the LED in starting and turning off the LED in ending, the user can visually identify whether the apparatus body is in starting or in ending.

Incidentally, in the embodiment, the digital broadcast receiving apparatus has been described, but the configuration of the invention can also be applied to a device in which long starting time as described above is required.

According to the invention, in the case that a power source operation is inputted by a user during starting sequence execution, it is selected and executed whether a starting sequence is resumed or an ending sequence is started based on the power source operation, so that the user can perform a desired power source operation without waiting for the completion of the starting sequence even when the user performs the power source operation by mistake.

Also, according to the invention, by blinking a power source lamp during starting sequence execution and turning off the power source lamp during ending sequence execution, even in the case of performing the power source operation as described above, a user can easily recognize whether the apparatus is in starting or in ending at present.

What is claimed is:

1. A digital broadcast receiving apparatus for receiving a digital broadcast signal and outputting a video signal and a sound signal of a channel selected, comprising:

an apparatus body;

power source operation means for accepting a power source operation of the apparatus body;

control means for starting execution of a starting sequence when a power source operation is inputted at a time of stopping the apparatus body, counting the number of power source operations inputted during execution of the starting sequence, and stopping the starting sequence when the power source operation is inputted at least once during the execution of the starting sequence, wherein the control means continues to count the number of power source operations after stopping the starting sequence, and determines whether a predetermined time interval is elapsed after a final power source operation to determine a total number of the power source operation; and wherein the control means restarts the execution of the starting sequence or starts the ending sequence in accordance with the total number of the power source operation.

2. The digital broadcast receiving apparatus as defined in claim 1, wherein the control means restarts the execution of the staffing sequence when the total number is an even number, and stops the execution of the ending sequence when the total number is an odd number.

3. The digital broadcast receiving apparatus as defined in claim 1, further comprising an operation display lamp which is turned on when the apparatus body is in operation and turned off when the apparatus body is not in operation;

wherein the control means blinks the operation display lamp during the starting sequence execution and turns off the operation display lamp during the ending sequence execution.

4. The digital broadcast receiving apparatus of claim 1, wherein executing the starting sequence comprises initializing an integrated circuit of each of a plurality of blocks of the digital broadcast receiving apparatus.

5. The digital broadcast receiving apparatus of claim 1, wherein the starting sequence is stopped during a latency period after execution of and before completion of the starting sequence.

* * * * *